Dec. 23, 1952   H. P. KEIL   2,622,519
MOISTENING DEVICE FOR MOTOR-DRIVEN DUPLICATING MACHINES
Filed Dec. 15, 1947   8 Sheets-Sheet 1

INVENTOR.
Henry P. Keil
BY
*Creek Wells*
Attorney

INVENTOR.
Henry P. Keil
BY
Attorney

Dec. 23, 1952  H. P. KEIL  2,622,519
MOISTENING DEVICE FOR MOTOR-DRIVEN DUPLICATING MACHINES
Filed Dec. 15, 1947  8 Sheets-Sheet 7

INVENTOR.
Henry P. Keil
BY Greek Wells
Attorney

Dec. 23, 1952            H. P. KEIL            2,622,519

MOISTENING DEVICE FOR MOTOR-DRIVEN DUPLICATING MACHINES

Filed Dec. 15, 1947            8 Sheets-Sheet 8

INVENTOR.
Henry P. Keil
BY Greek Wells
Attorney

Patented Dec. 23, 1952

2,622,519

UNITED STATES PATENT OFFICE 2,622,519

MOISTENING DEVICE FOR MOTOR-DRIVEN DUPLICATING MACHINES

Henry P. Keil, Chicago, Ill., assignor to The Fixture Hardware Corporation, Chicago, Ill., a corporation of Illinois Application December 15, 1947, Serial No. 791,881

9 Claims. (Cl. 101—132.5)

My invention relates to improvements in duplicating machines and is particularly directed to a novel arrangement whereby, the machine may be power driven from a motor or like source of power, and controlled with a single simple lever control.

It is a purpose of my invention to provide a machine of this character with a novel arrangement of parts whereby the connection of power to the drum to rotate it is accomplished simultaneously with the bringing of the feeding and moistening rollers into operative relation to each other.

It is also a purpose of my invention to provide a novel tensioning means for insuring adequate pressure upon a sheet being moistened and fed to the drum, regardless of whether the sheet is a thin one or one of thick card stock.

My invention contemplates also the provision of a novel arrangement of moistening fountain and moistening rollers that is particularly advantageous in maintaining the rollers clean and in providing for ready replacement of one roller with another which is desirable in the roller combination employed for obtaining a variation in the amount of moisture applied to a copy sheet to thereby make more or less bright copies.

My invention contemplates also the provision of a novel drive means for the drum of a duplicating machine which drive means is free of any clutch mechanism, other than the operative parts of the duplicating mechanism, for connecting the drum to a source of power, the drive means being so arranged that the motor may run continuously and be connected to the drum, and the duplicating mechanism made operative, at the will of the operator.

A further object of my invention is to provide a novel roller mounting for the moistening roller assembly in a duplicating machine.

It is also an object of my invention to provide a new feed tray and sheet guide for duplicating machines wherein the side guides may be moved to various positions and held there without the troublesome springs beneath the tray, heretofore employed, the feed tray having means to protect the tray and sheet feeding rollers from the wearing action of the sheet feeding mechanism when the copy sheets have all been removed from the tray and the sheet feeding mechanism is allowed to continue to operate.

The nature and advantages of my invention will appear more fully from the following description and the accompanying drawings wherein a preferred form of my invention is shown. It should be understood, however, that the description and drawings are illustrative only and should not be considered as limiting the invention except insofar as it is limited by the claims.

In the drawings:

Figure 13 is a fragmentary sectional view taken on the line 13—13 of Figure 3.

Figure 1:
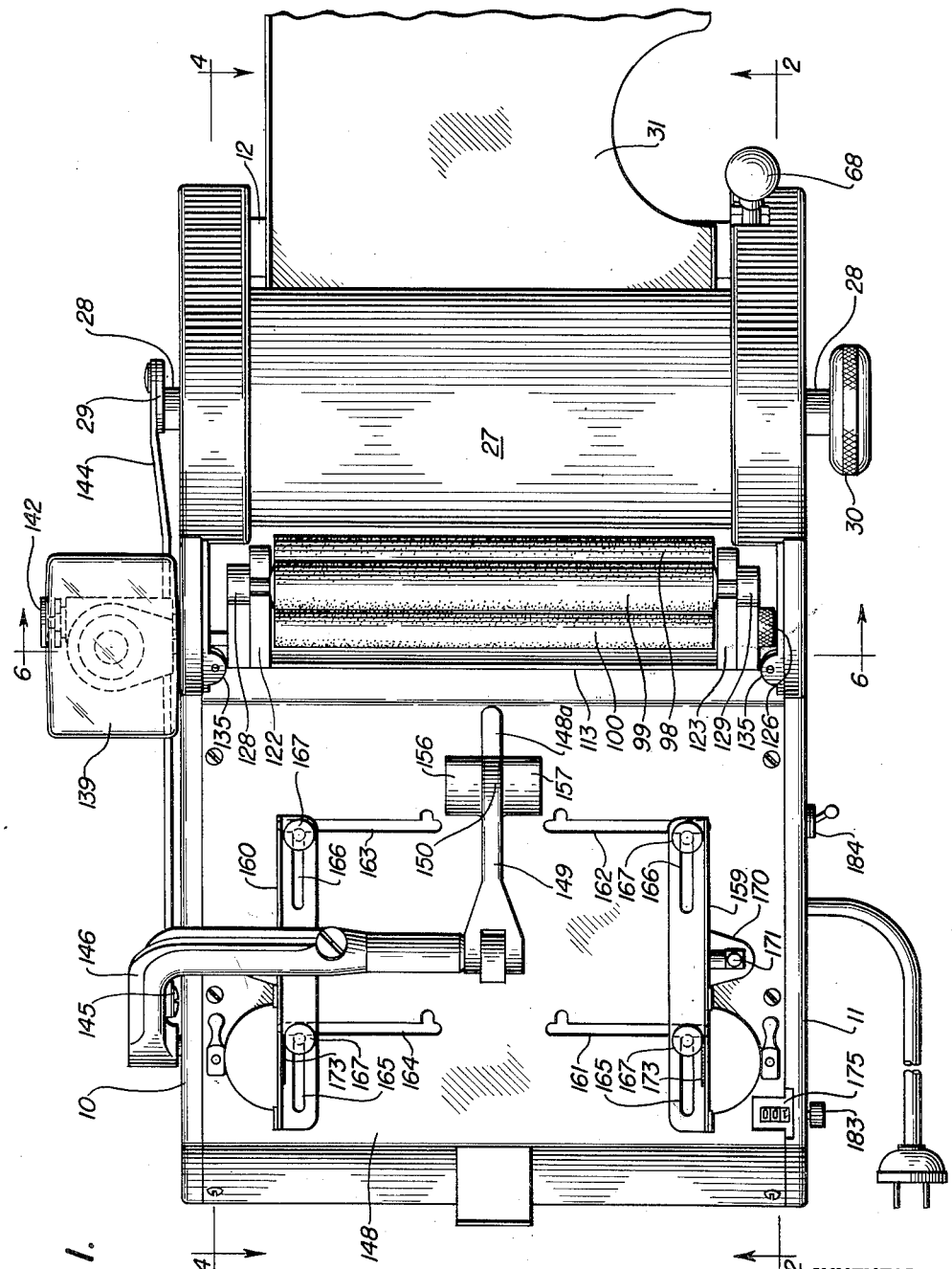
Figure 1 is a plan view of a duplicating machine embodying my invention.

Referring now to the drawings, the machine as shown has opposite side frames 10 and 11 which are connected at their opposite ends by cross bars 12 and 13. Each side frame is cast, preferably of a light metal such as an aluminum alloy, and has laterally extending bracket portions 14 and 15 to which the cross bars 12 and 13 are bolted. Rubber feet 16 are also bolted to the bracket portions by the same screw-bolts 17 that secure the cross bars. There are also two cross tie rods 18 and 20, connecting the side frames. (See Figure 5.) The tie rod 20 supports the ends of two side plates 21 and 22 which are part of a motor and drive mechanism subframe. The side plates are further supported by two studs 23 and 24 that are threaded into bosses 25 and 26 near the front ends of the side frames 10 and 11.

The duplicating drum 27 on which master sheets are carried is mounted on a shaft 28 that is rotatably supported in suitable bearings (not shown in the side frames 10 and 11). The shaft 28 projects beyond the frames 10 and 11 as indicated in Figure 1 where one end of the shaft 28 is shown with a paper feed operating crank 29 thereon, and the other end of the shaft is shown with a hand wheel 30 thereon by which the drum can be turned by hand. The receiving tray 31 is supported beneath the drum to receive copy sheets after they have contacted the master sheet on the drum. The copy sheets are pressed against the master sheet on the drum by a pressure roller 32. The pressure roller 32 is the driving member for rotating the drum 27 and rotation of the drum is effected by driving the pressure roller by a suitable motor and drive mechanism.

The motor is shown at 33 and is supported between the side plates 21 and 22 by supporting blocks 34 and 35, the top portions of which are removable to permit the motor to be removed. The motor has a worm shaft 36 which meshes with a worm gear 37 that is fixed on a shaft 38. One end of the shaft 38 is journalled in a bearing 39 in the side plate 21 and the other end is journalled in a boss 40 on the side frame 11. A bearing 41 is provided in the side plate 22 for the shaft. The worm shaft and gear are lubricated continuously by a grease retainer 42 which bears against the under face of the worm shaft 36. Grease is fed into the retainer 42 from a grease cup 43. The free end of the worm shaft 36 is journalled in a bearing block 44, the upper end of which is mounted on the tie rod 20 and the lower end of which is mounted on a rod 45 that is secured in the side plates 21 and 22. The rod 45 also serves to mount a yoke 46 which secures the retainer 42 and the grease cup 43. The grease cup is connected to the retainer by an elbow 47 and a pipe 48.

Figure 3:
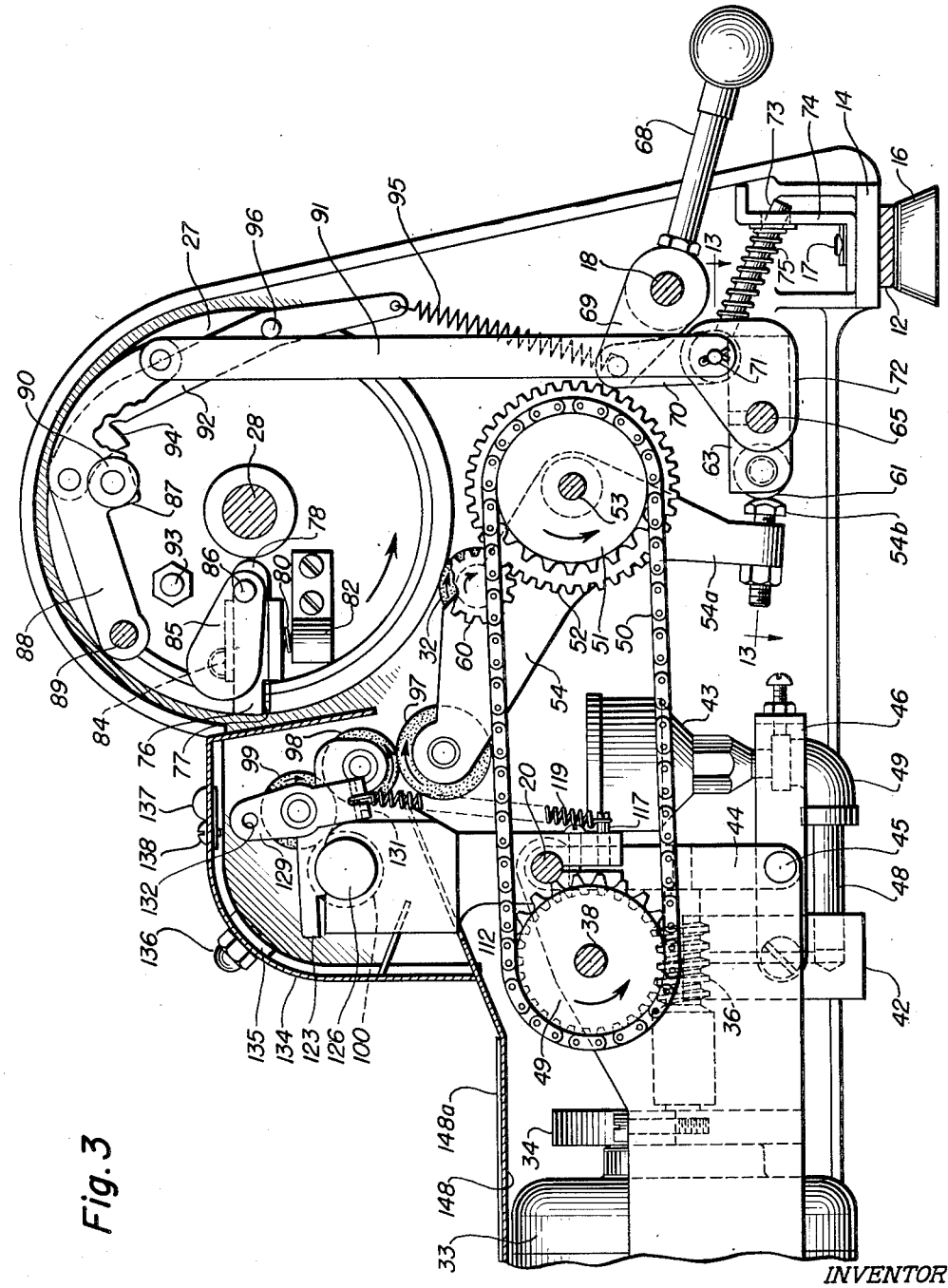
Figure 3 is an enlarged fragmentary sectional view taken on the line 2—2 of Figure 1, but showing the parts in a different position from that shown in Figure 2.
Figure 5:
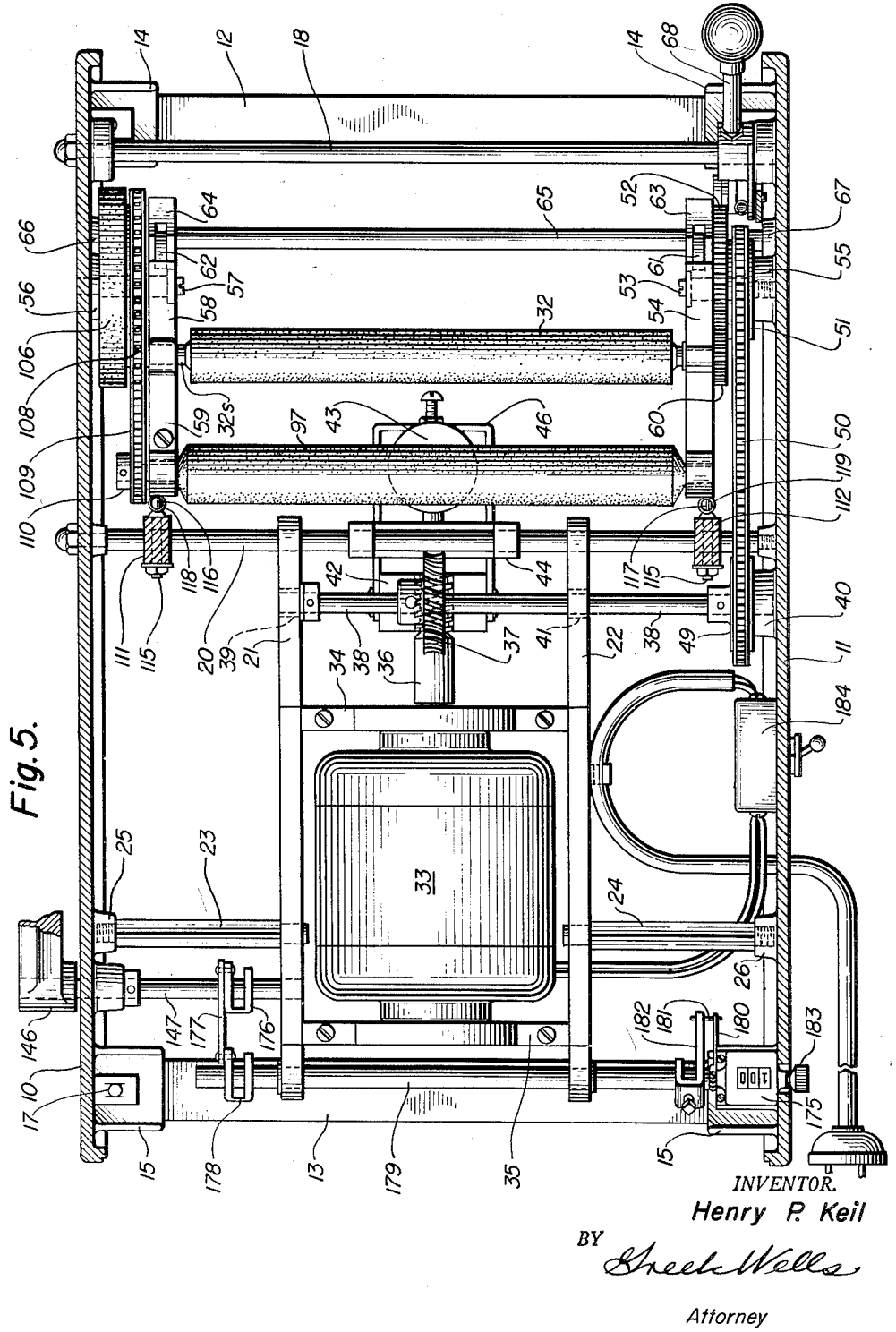
Figure 5 is a sectional view taken on the line 5—5 of Figure 2.
Figure 6:
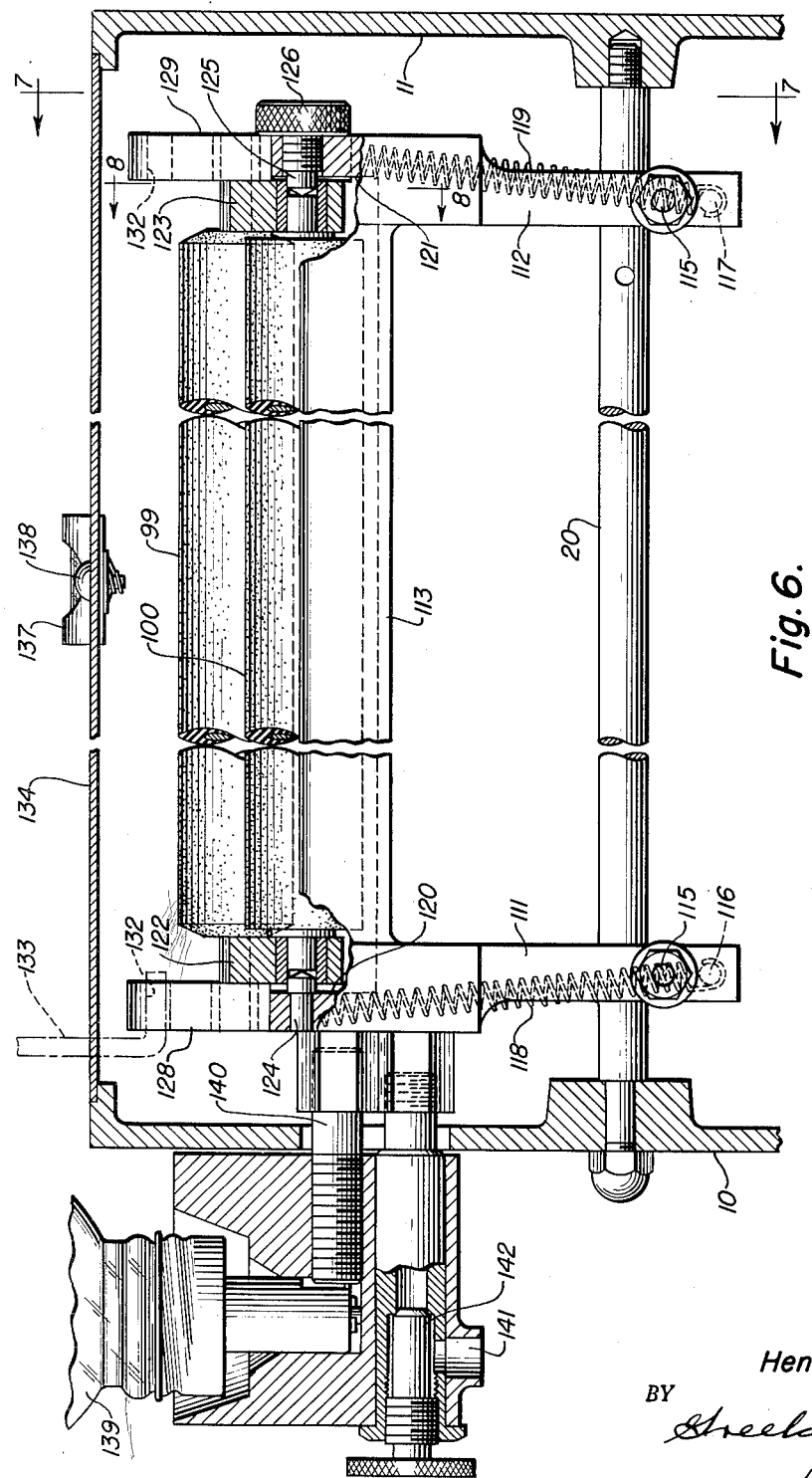
Figure 6 is a sectional view taken on the line 6—6 of Figure 1.
Figure 7:
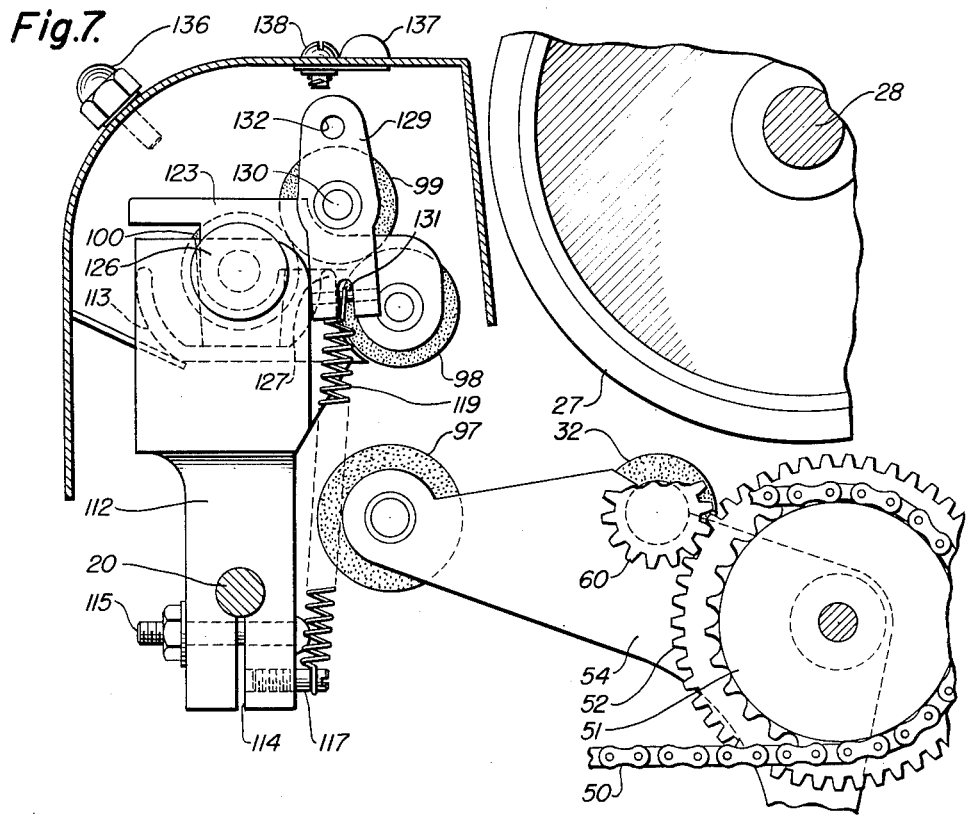
Figure 7 is a fragmentary sectional view taken on the line 7—7 of Figure 6.
Figure 8:
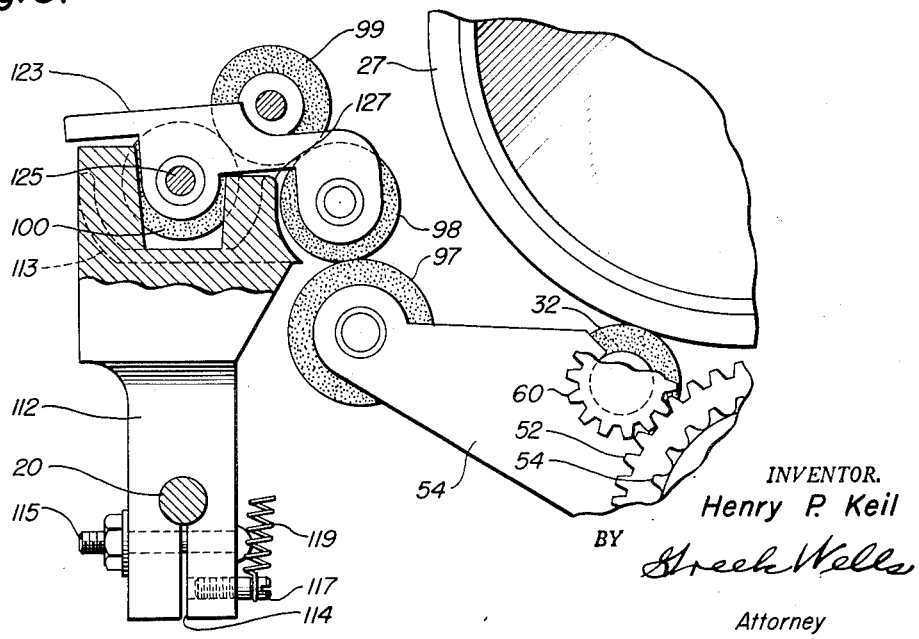
Figure 8 is a sectional view on the line 8—8 of Figure 6.
Figure 9:
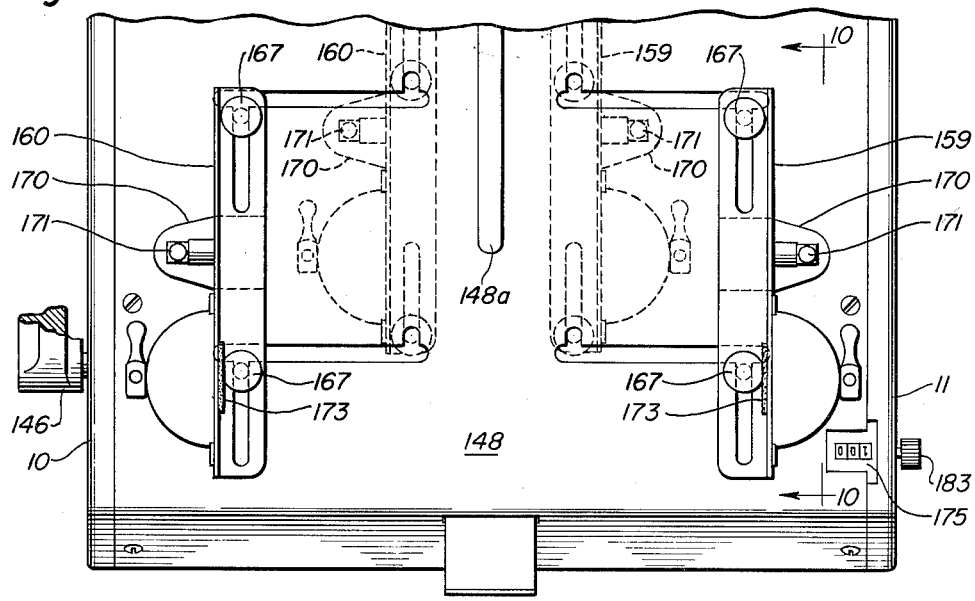
Figure 9 is a plan view of a portion of the feed tray of the machine.
Figure 10:
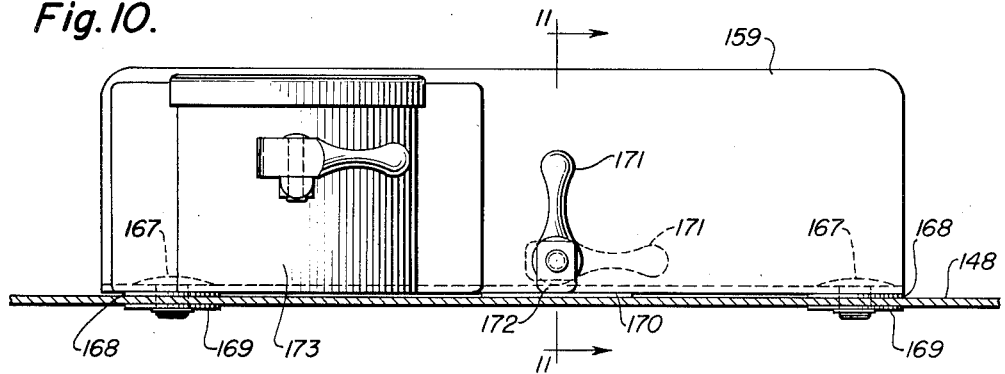
Figure 10 is a sectional view on the line 10—10 of Figure 9.
Figure 11:
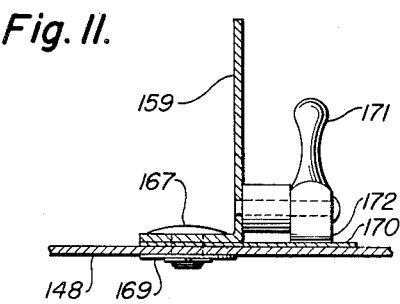
Figure 11 is a fragmentary sectional view on the line 11—11 of Figure 10.
Figure 12:
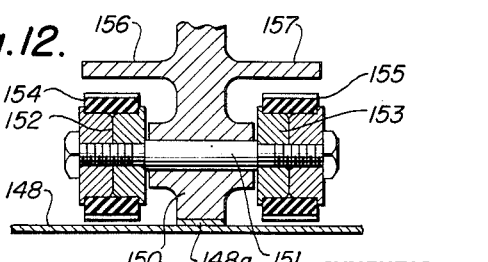
Figure 12 is an enlarged fragmentary sectional view taken on the line 12—12 of Figure 2.

The mechanism by which motion is transmitted from the shaft 38 (driven by the motor 33 through the worm 36 and gear 37) to the pressure roller 32 is shown best in Figures 3 and 5. A sprocket wheel 49 is secured on the shaft 38. A sprocket chain 50 connects the sprocket wheel 49 with a sprocket wheel 51 which is integrally joined with a gear 52 of larger diameter. The sprocket wheel 51 and the gear 52 are journalled on a stub shaft 53 which also pivotally mounts a rocker arm 54 that carries one end of the pressure roller 32. The stub shaft 53 is mounted in a boss 55 formed on the side frame 11. A similar boss 56 on the side frame 10 has a stub shaft 57 secured in it and the stub shaft 57 supports a second rocker arm 58 which supports the other end of the pressure roller 32. A spring retainer 59 holds the pressure roller shaft 32s in a seat in the arm 58. The other end of the shaft 32s has a pinion 60 thereon which meshes with the gear 52.

The rocker arms 54 and 58 have depending portions 54a and 58a (Figures 3 and 4) which have adjustable stops 54b and 58b thereon. These stops are positioned to be engaged by rollers 61 and 62 that are secured in the ends of arms 63 and 64 which are fastened on a rock shaft 65. The rock shaft 65 is rotatably mounted in bosses 66 and 67 on the side frames 10 and 11. When the arms 63 and 64 are moved from the positions illustrated in Figures 2 and 4 to the position indicated in Figure 3 they move the rocker arms 54 and 58 in a direction to bring the pressure roller 32 against the drum 27.

The mechanism by which the rocker arms 54 and 58 are moved to bring the pressure roller into and out of drum engaging position is illustrated best in Figures 2 to 5 inclusive and in Figure 13. This mechanism includes a hand lever 68 pivoted on the cross tie rod 18. The hand lever 68 has an arm 69 which is connected by a link 70 and a pin 71 to a plate 72 that is rigidly connected with the arm 63 and the shaft 65. A pin 73 is also pivoted by the pin 71 to the link 70 and plate 72. This pin 73 extends through a bracket 74 that is mounted on the bracket portion 14 by the screw bolt 17. The pin 73 has a coiled spring 75 thereon between the bracket 74 and the plate 72. The spring is under compression so that it tends to oppose movement of the assembly comprising the arm 63, the plate 72, the pin 71, and the link 70 from either the position shown in Figure 2 or that shown in Figure 3 to the other position.

Figure 2:
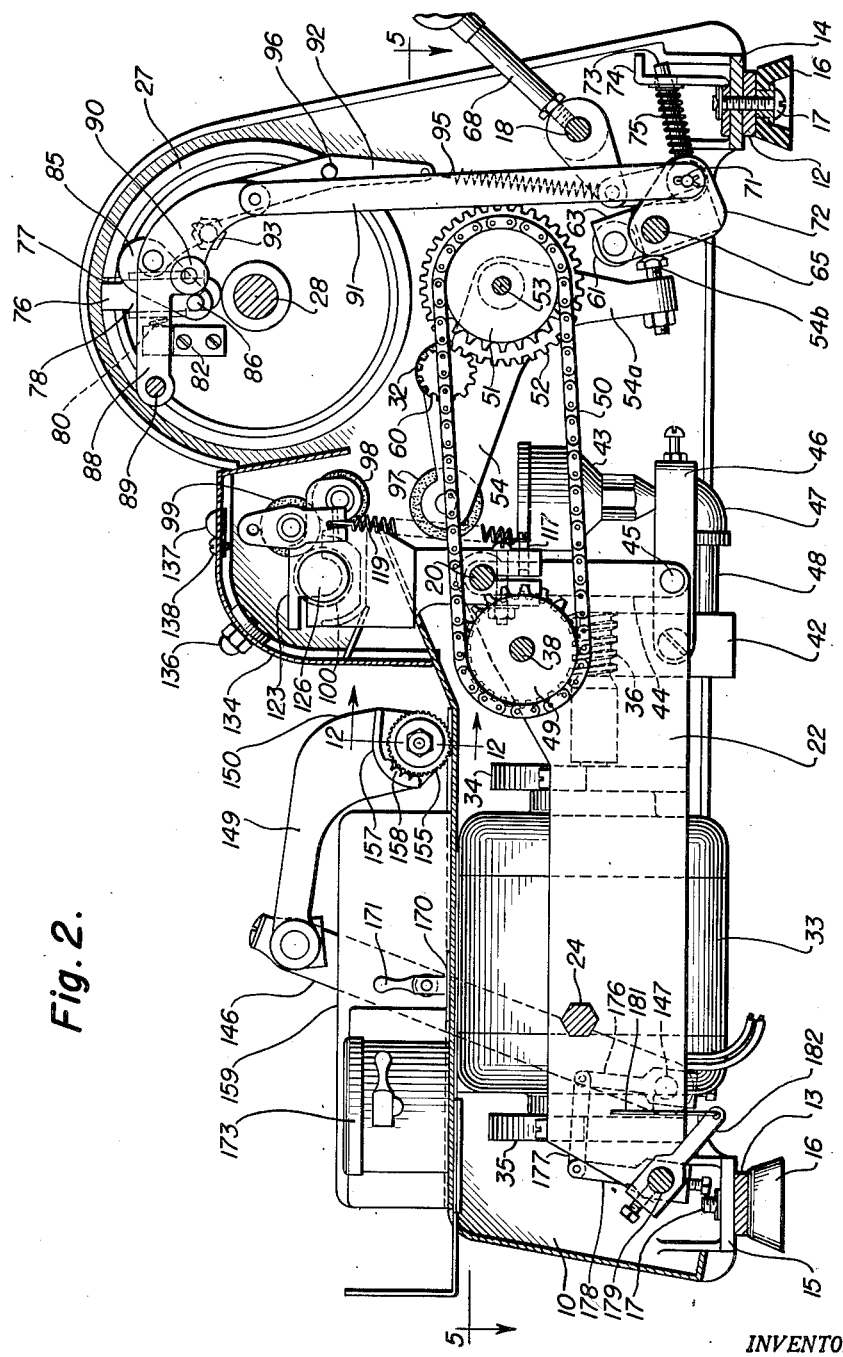
Figure 2 is a sectional view taken on the line 2—2 of Figure 1.
Figure 4:
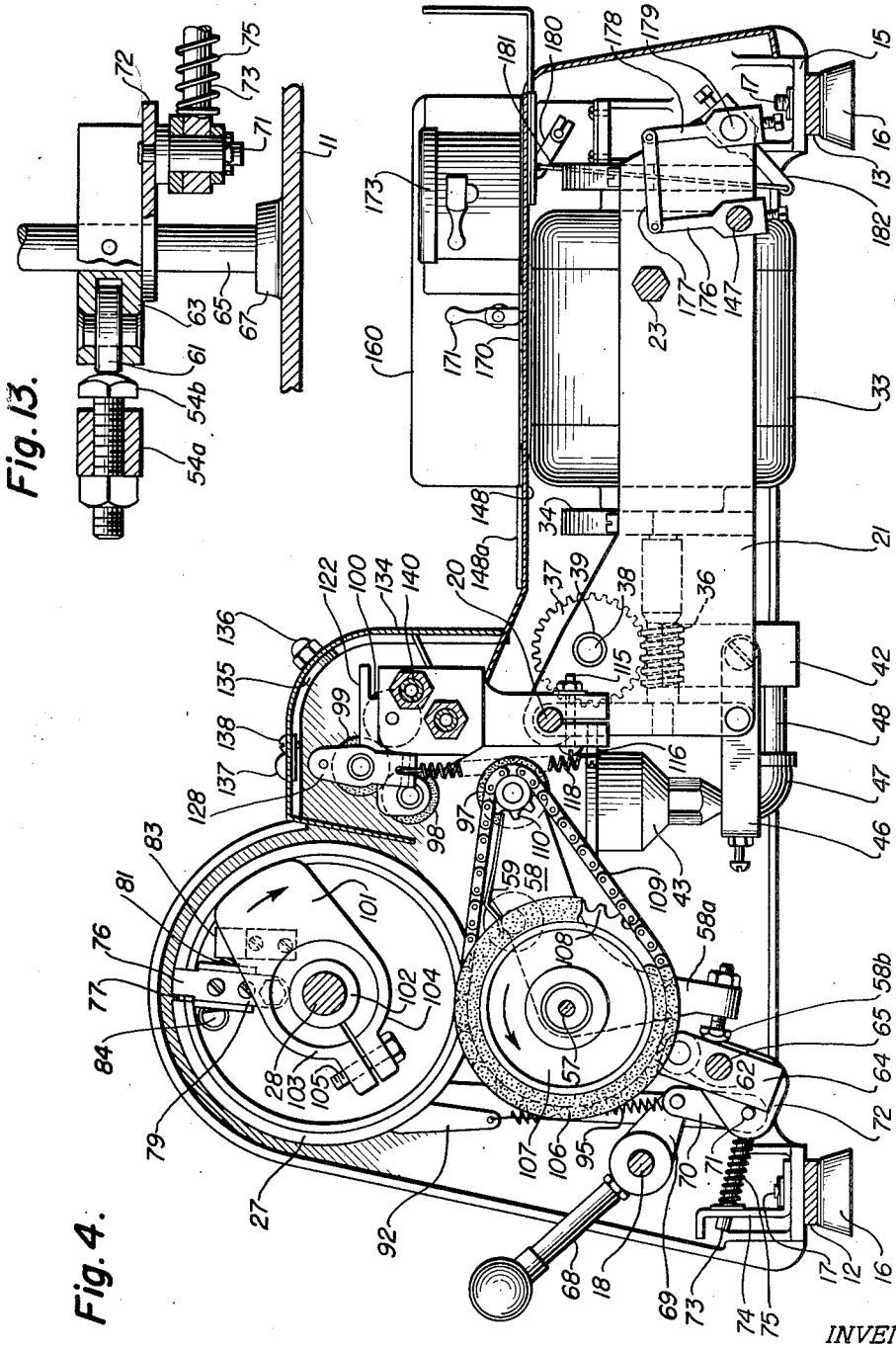
Figure 4 is a sectional view taken on the line 4—4 of Figure 1.

The hand lever also serves to control the mechanism for opening and closing the master sheet gripping means of the drum. As best shown by Figures 2, 3 and 4, a gripping bar 76 is mounted in a slot 77 in the drum surface. The bar is pivoted at its ends by arms 78 and 79 to the drum ends so that it may rock from one side of the slot 77 to the other. Springs 80 and 81 are mounted on the drum ends by housings 82 and 83 and press the arms in one (master sheet gripping) direction. In order to open the gripping bar, it is necessary to press it against the force of the springs 80 and 81. This is done by turning a flattened cam shaft 84 (Figure 4) that is journalled in the drum and bears against the arms 78 and 79. The cam shaft 84 has an arm 85 fixed thereon and extending toward the drum shaft 28. This arm has a pin 86 in its free end. The pin 86 is engaged, when it is desired to open the master sheet gripping means, by a stop shoulder 87 and a roller 90 on a lever arm 88. The lever arm is pivoted to the side frame 11 by a pivot pin 89. A link 91 connects the plate 72 with the lever arm 88, so that, when the hand lever 68 is moved to its upper position as shown in Figures 2 and 4, the lever 88 is pulled down to position to open the gripper bar as the drum is turned clockwise by hand.

The advance of the drum is also stopped at this time by the interposition of a lever 92, which is pivoted on the lever 88, in the path of a stop pin 93 on the drum. The lever 92 has a shoulder 94 thereon for engaging the stop pin. The lever 92 is actuated by a spring 95 connecting it with the lever arm 69. A pin 96 on the lever 92 rides on the link 91 to hold the lever 92 out of the path of the pin 93 when the parts are in running position as shown in Figure 3.

The arms 54 and 58 also support a lower copy sheet feeding roller 97. This roller cooperates with an upper copy sheet feeding and moistening roller 98 and its cooperating liquid feeding rollers 99 and 100. The driving means for the feeding and moistening rollers 97 and 98 is shown best by Figures 4 to 8 inclusive. This means comprises a cam 101 adjustably fixed on the drum 27 which has a boss 102 formed on the drum end and jaws 103 and 104 on the cam clamped together on the boss 102 by a screw bolt 105. The cam 101 strikes a resilient rubber ring 106. This ring is mounted on a hub 107 which also has a sprocket wheel 108 formed thereon. A chain 109 connects the sprocket wheel 108 with a sprocket wheel 110 which is fixed on the shaft of the roller 97. The stub shaft 57 supports the hub 107 in addition to its support of the arm 58.

By virtue of a novel arrangement the proper pressure is maintained between the rollers 97 and 98 regardless of the weights or thicknesses of master sheets and copy sheets that may be used. It will be appreciated that thicker copy sheets, when engaged between the drum 27 and the pressure roller 32, will tend to depress the roller 97. The pressure between the rollers 97 and 98 must be substantially independent of this effect. The novel relation of parts will now be described in connection with the mounting of the moistening means including the rollers 98, 99 and 100.

The cross tie rod 20 supports two end pieces 111 and 112 that are provided to support a liquid carrying trough 113. The lower ends of the pieces 111 and 112 are split as indicated at 114 and clamped on the rod 20 by bolts 115. A pin 116 is secured in the end piece 111 and a pin 117 is secured in the end piece 112, both pins being threaded into their respective end pieces near the lower ends thereof. A spring 118 is anchored to the pin 116 and a spring 119 is anchored to the pin 117.

At their upper ends the end pieces 111 and 112 are recessed as shown at 120 and 121 to receive roller mounting brackets 122 and 123. A pin 124 is pressed into the end piece 111 and pivots the bracket 122. A pin 125 is threaded into the end piece 112 and pivots the bracket 123. A knurled head 126 is provided on the pin 125 so it can be removed when the rollers are to be taken out of the machine. The brackets 122 and 123 extend toward the drum 27 and beyond the front lip 127 of the trough 113, then downward to provide end supports in which the shaft of the roller 98 is mounted. As seen best in Figures 7 and 8, the brackets 122 and 123 may rock upward from a position where they rest upon the lip 127 when the roller 97 moves upward against the roller 98.

The roller 99 is supported on the rollers 98 and 100. It has two removable brackets 128 and 129 at its ends. These brackets have center apertures 130 to receive the shaft of the roller 99. They have pins 131 at their lower ends to attach the springs 118 and 119 to them. Apertures 132 are provided in the upper ends of the brackets 128 and 129 so they may be lifted with a hook-shaped wire lifter 133 (see Figure 6) when they are being placed on the shaft of the roller 99. The rollers are covered by a sheet metal cover 134 which is fastened to ears 135 (see Figure 4) on the side frames 10 and 11 by cap screws 136. A spirit level 137 is mounted on the cover 134 by a screw 138. The cover 134 is removed in Figure 1.

This construction is quite convenient for cleaning. When the trough 113 needs cleaning to remove paper lint or when the rollers need cleaning, the rollers can be readily removed after removal of the cover, by lifting off the brackets 128 and 129 and loosening the pin 125. When this is done, all three rollers can be lifted out. Also in this moistening mechanism the middle roller 99 is porous. If more moisture is needed to make brighter copies, the brackets 128 and 129 are removed and a more porous roller is substituted for the less porous one. In all cases the pressure between the rollers is essentially the same since it is due in part to the weight of the rollers, a fixed amount, and in part to the pull of the springs 118 and 119 which pull varies very little within the range of movement of the rollers 97 and 98 while they are engaged. When the machine is not in operation there is no pressure between the rollers 97 and 98.

Liquid is supplied to the trough 113 in a known manner from a container (inverted bottle) 139 and a tube 140. A drain outlet is provided at 141 under control of a valve 142. This means of supplying liquid may be supplanted by other means within the scope of my invention.

Referring now to Figures 1, 2, 5, and 9 to 12 inclusive, the copy sheet holding and feeding mechanism will be described. The crank 29 on the drum shaft 28 operates a link 144 that has its other end pivoted at 145 to a sheet feeder actuating arm 146. The arm 146 is fixed on a rock shaft 147 that is mounted in the side frame 10 and the side piece 21. The arm 146 extends upwardly and laterally over a copy sheet holding tray 148. A second arm 149 is pivoted on the free end of the arm 146 and extends toward the drum. At its front end the arm 149 has a head 150 in which a shaft 151 is loosely mounted. The shaft mounts two hubs 152 and 153 for corrugated rubber rings 154 and 155. Guards 156 and 157 have ribs 158 thereon to check rotation of the rings 154 and 155 when the arm 149 is moving in a direction to press them against the ribs 158, that is, toward the drum.

The tray 148 has a center strip 148a raised directly beneath the head 150 so that when the copy sheets have all been fed from the tray this strip 148a will hold the head high enough to prevent the rings 154 and 155 from riding on the tray surface. In this way excessive wear on the feeding rings 154 and 155 and on the tray beneath them is prevented.

The tray 148 has side guides 159 and 160 which are adjustable toward and away from each other and also lengthwise of the tray. The tray has cross slots 161, 162, 163 and 164. The side guides have their horizontal portions provided with slots 165 and 166 running lengthwise from their ends toward the centers thereof. Large headed pins 167 extend through the slots and have large washers 168 and 169 between the guides and the tray and beneath the tray. Also intermediate the ends of the guides I provide means to lock the guides at any place they are adjusted to. This means comprises plates 170 welded to the side guides and extending outwardly therefrom. Over each plate I mount a cam lever 171 with a cam end 172 which, when the lever is upright, presses the plate 170 down into tight engagement with the tray to prevent shifting of the side guide. The side guides are also provided with adjustable grippers 173, similar to those shown in my application, Serial Number 726,502, for gripping the side edges of a stack of copy sheets placed between the guides 159 and 160.

The rocking of the lever arm 146 also actuates a counting device 175 of any suitable type in the following manner. The shaft 147 carries an arm 176 which is fixed thereon. This arm is connected by a link 177 to a like arm 178 fixed on a shaft 179 that is journalled in the side pieces 21 and 22. Near the side frame 11 the counter 175 is mounted. It has an operating arm 180 which is coupled by a link 181 to an arm 182 that is fixed on the shaft 179. A reset handle 183 is shown for the counter.

Control of the motor 33 is by means of a switch 184 that is mounted on the side frame 11. However, except for cutting off the motor when the machine is to be left idle for some time, the control is capable of being entirely handled by the lever 68. The drum is rotated and the sheet feeding and moistening devices are operated only when the lever 68 is moved into position to bring the pressure roller 32 into contact with the drum.

When a master sheet is to be replaced, the drum is turned backward from its stopping point until the levers 88 and 92 perform their functions of opening the gripper and locking the drum against further movement. It is then necessary to actuate the lever 68 to again apply power to the drum. In so doing the locks for the drum are released.

Having thus described my invention, I claim:

1. In a duplicating apparatus of the character described, a drum, a pressure roller for pressing sheets against the drum, lever arms supporting the pressure roller and pivoted to swing it toward and away from the drum, a copy sheet feeding roller carried by said lever arms and spaced toward the free ends of said arms from the pressure roller, a copy sheet feeding and moistening roller cooperating with the copy sheet feeding roller to advance sheets, brackets carrying the moistening roller, a liquid trough, a roller therein, coaxial pivot members in the trough for the brackets and the last named roller, a transfer roller resting on the two last named rollers, bearing brackets hung on the ends of the transfer roller, and springs attached to the bearing brackets and pulling the transfer roller toward the other rollers.

2. In a duplicating apparatus of the character described, a drum, a pressure roller for pressing sheets against the drum, lever arms supporting the pressure roller and pivoted to swing it toward and away from the drum, a copy sheet feeding roller carried by said lever arms and spaced toward the free ends of said arms from the pressure roller, a copy sheet feeding and moistening roller cooperating with the copy sheet feeding roller to advance sheets, brackets carrying the moistened roller, a liquid trough, a roller therein, coaxial pivot members in the trough for the brackets and the last named roller, a transfer roller resting on the two last named rollers, bearing brackets removably hung on the ends of the transfer roller, and springs attached to the bearing brackets and pulling the transfer roller toward the other rollers.

3. In a duplicating apparatus of the character described, a drum, a pressure roller for pressing sheets against the drum, lever arms supporting the pressure roller and pivoted to swing it toward and away from the drum, a copy sheet feeding roller carried by said lever arms and spaced toward the free ends of said arms from the pressure roller, a copy sheet feeding and moistening roller cooperating with the copy sheet feeding roller to advance sheets, brackets carrying the moistening roller, a liquid trough, a roller therein, coaxial pivot members in the trough for the brackets and the last named roller, one of said pivot members being retractable to release the roller, a transfer roller resting on the two last named rollers, bearing brackets removably hung on the ends of the transfer roller, and springs attached to the bearing brackets and pulling the transfer roller toward the other rollers.

4. In a duplicating apparatus of the character described, the combination with a master sheet holding drum, of a pressure roller cooperating therewith to press copy sheets against a master sheet on the drum, copy sheet feeding and moistening means driven by the drum to advance moistened copy sheets to the drum and pressure roller, power driven means operably connected to the pressure roller to rotate it, said drum being driven only by engagement with the pressure roller mounting means for the pressure roller movably mounting it for engagement and separation from the drum, whereby to drive and release the drum, means to stop rotational advance of the drum when it is released from the pressure roller, and a hand lever operable to move the pressure roller into and out of engagement with the drum while the pressure roller is being rotated.

5. In a duplicating apparatus of the character described, the combination with a master sheet holding drum, having a releasable gripper for attaching one edge of a master sheet thereto, of a pressure roller cooperating therewith to press copy sheets against a master sheet on the drum, copy sheet feeding and moistening means driven by the drum to advance moistened copy sheets to the drum and pressure roller, power driven means operably connected to the pressure roller to rotate it, said drum being driven only by engagement with the pressure roller mounting means for the pressure roller movably mounting it for engagement and separation from the drum, whereby to drive and release the drum, means to stop rotational advance of the drum when it is released from the pressure roller, and a hand lever operable to move the pressure roller into and out of engagement with the drum while the pressure roller is being rotated.

6. In a duplicating apparatus of the character described, the combination with a master sheet holding drum, having a releasable gripper for attaching one edge of a master sheet thereto, of a pressure roller cooperating therewith to press copy sheets against a master sheet on the drum, copy sheet feeding and moistening means driven by the drum, power driven means operably connected to the pressure roller to rotate it, said drum being driven only by engagement with the pressure roller mounting means for the pressure roller movably mounting it for engagement and separation from the drum, whereby to drive and release the drum, means to stop rotational advance of the drum when it is released from the pressure roller, a hand lever operable to move the pressure roller into and out of engagement with the drum while the pressure roller is being rotated, and means connected to the hand lever and movable thereby to engage and render the stop means ineffective upon movement of the hand lever into position to engage the pressure roller with the drum.

7. In a duplicating machine, a supporting frame, a drum mounted in the frame having means thereon to mount a master sheet, a pressure roller mounted in the frame for pressing copy sheets against the drum, a liquid trough mounted on the frame adjacent to the drum, a roller therein, a moistening roller between the trough and the drum, brackets pivoted to the ends of the trough and supporting the moistening roller, a transfer roller resting on the two last named rollers, spring means and bearings at the ends of said transfer roller for pressing the transfer roller downwardly, a copy sheet feeding roller beneath the moistening roller, supporting arms carrying said copy sheet feeding roller and pivoted in the frame, and a hand lever operably connected to the arms to move the feed roller from a lower inoperative position separated from the moistening roller upwardly against the moistening roller and to lift the moistening roller and the transfer roller against the force of said spring means.

8. In a duplicating machine, a supporting frame, a drum mounted in the frame having means thereon to mount a master sheet, a pressure roller mounted in the frame for pressing copy sheets against the drum, a liquid trough mounted on the frame adjacent to the drum, a roller therein, a moistening roller between the trough and the drum, brackets carrying said moistening roller and extending over the adjacent side of the trough and having portions in the trough, the roller in the trough being pivotally mounted on the bracket portions in the trough, pivot members in the ends of the trough pivotally supporting the brackets, a transfer roller resting on the two last named rollers, spring means and bearings at the ends of said transfer roller for pressing the transfer roller downward, a copy sheet feeding roller beneath the moistening roller, and means to raise and lower the copy sheet feeding roller into and out of pressure engagement with the moistening roller.

9. In a duplicating apparatus of the character described, a drum, a pressure roller for pressing sheets against the drum, lever arms supporting the pressure roller and pivoted to swing it toward and away from the drum, a copy sheet feeding roller carried by said lever arms and spaced toward the free ends of said arms from the pressure roller, a copy sheet feeding and moistening roller cooperating with the copy sheet feeding roller to advance sheets, brackets carrying the moistening roller, a liquid trough, a roller therein, the bracket members extending into the trough, means on the brackets pivotally supporting the roller in the trough, a transfer roller resting on the two last named rollers, spring means pulling the transfer roller down against the said last named rollers and pressing the brackets against the trough edge, the copy sheet feeding roller being beneath the moistening roller, and manually operable means to raise the lever arms thereby to lift the feeding and moistening rollers against the force of said spring means.

HENRY P. KEIL.

REFERENCES CITED

The following references are of record in the file of this patent:

UNITED STATES PATENTS

| Number | Name | Date |
|---|---|---|
| 1,788,782 | Thatcher | Jan. 13, 1931 |
| 1,828,298 | Shaver Jr. | Oct. 20, 1931 |
| 1,957,483 | Wolfson | May 8, 1934 |
| 1,964,498 | Brasseur | June 26, 1934 |
| 2,072,534 | Terry | Mar. 2, 1937 |
| 2,112,341 | Klemm | Mar. 29, 1938 |
| 2,126,514 | Storck et al. | Aug. 9, 1938 |
| 2,165,535 | Brownsey | July 10, 1939 |
| 2,185,682 | Pittman | Jan. 2, 1940 |
| 2,220,282 | Ritzerfeld | Nov. 5, 1940 |
| 2,231,639 | Ritzerfeld | Feb. 11, 1941 |
| 2,271,954 | Rockhill | Feb. 3, 1942 |
| 2,349,634 | Neal | May 23, 1944 |
| 2,351,863 | Lavanhagen | June 20, 1944 |
| 2,364,942 | Bradt | Dec. 12, 1944 |
| 2,573,810 | Rundblad | Nov. 6, 1951 |

FOREIGN PATENTS

| Number | Country | Date |
|---|---|---|
| 580,577 | Great Britain | Sept. 12, 1946 |